Nov. 12, 1963  R. K. FRANKLIN ETAL  3,110,171
HIGH CAPACITY LIQUID METER
Filed April 2, 1959  4 Sheets-Sheet 1
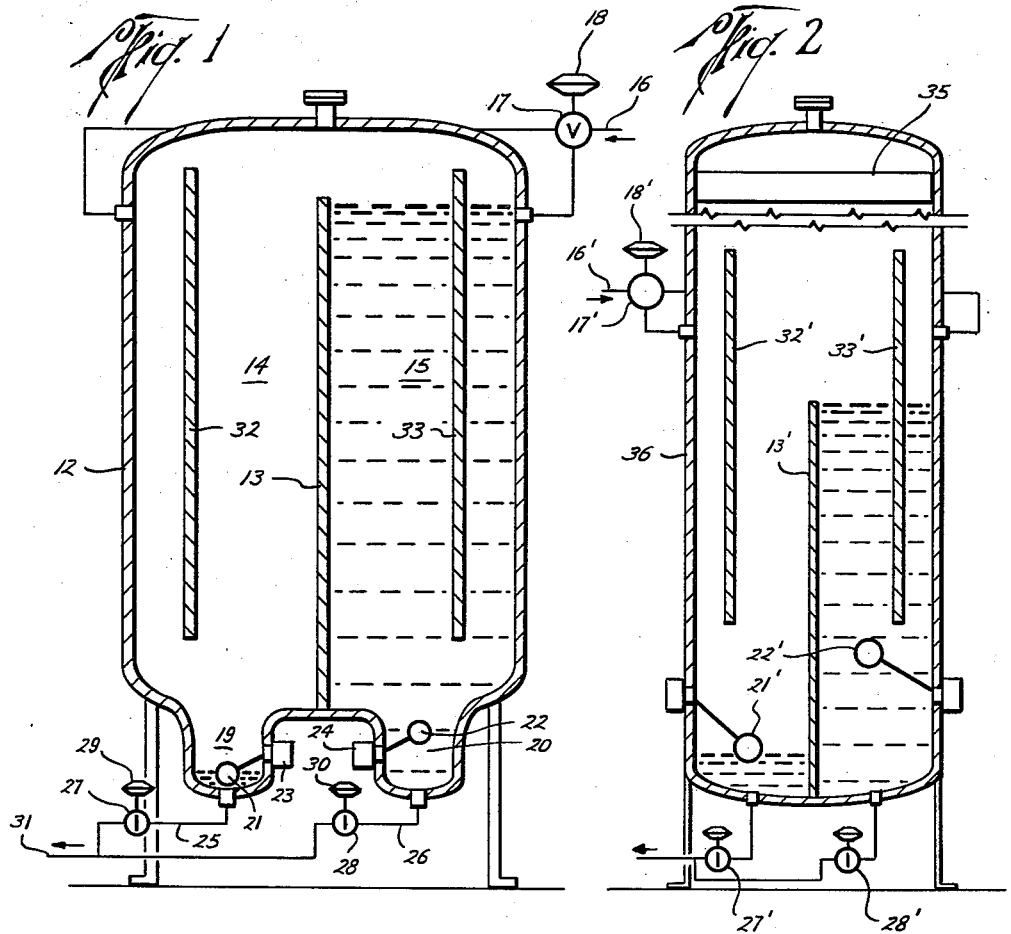
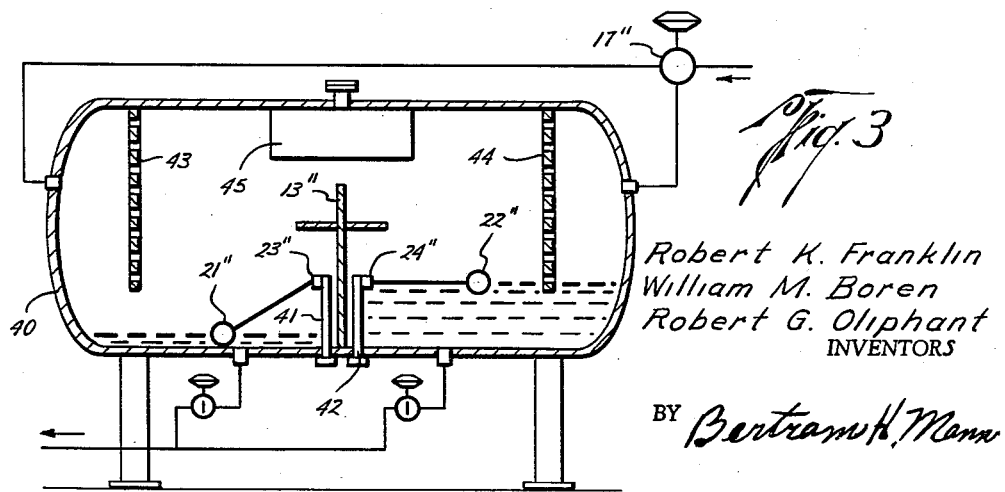
Robert K. Franklin
William M. Boren
Robert G. Oliphant
INVENTORS
BY Bertram H. Mann
ATTORNEY

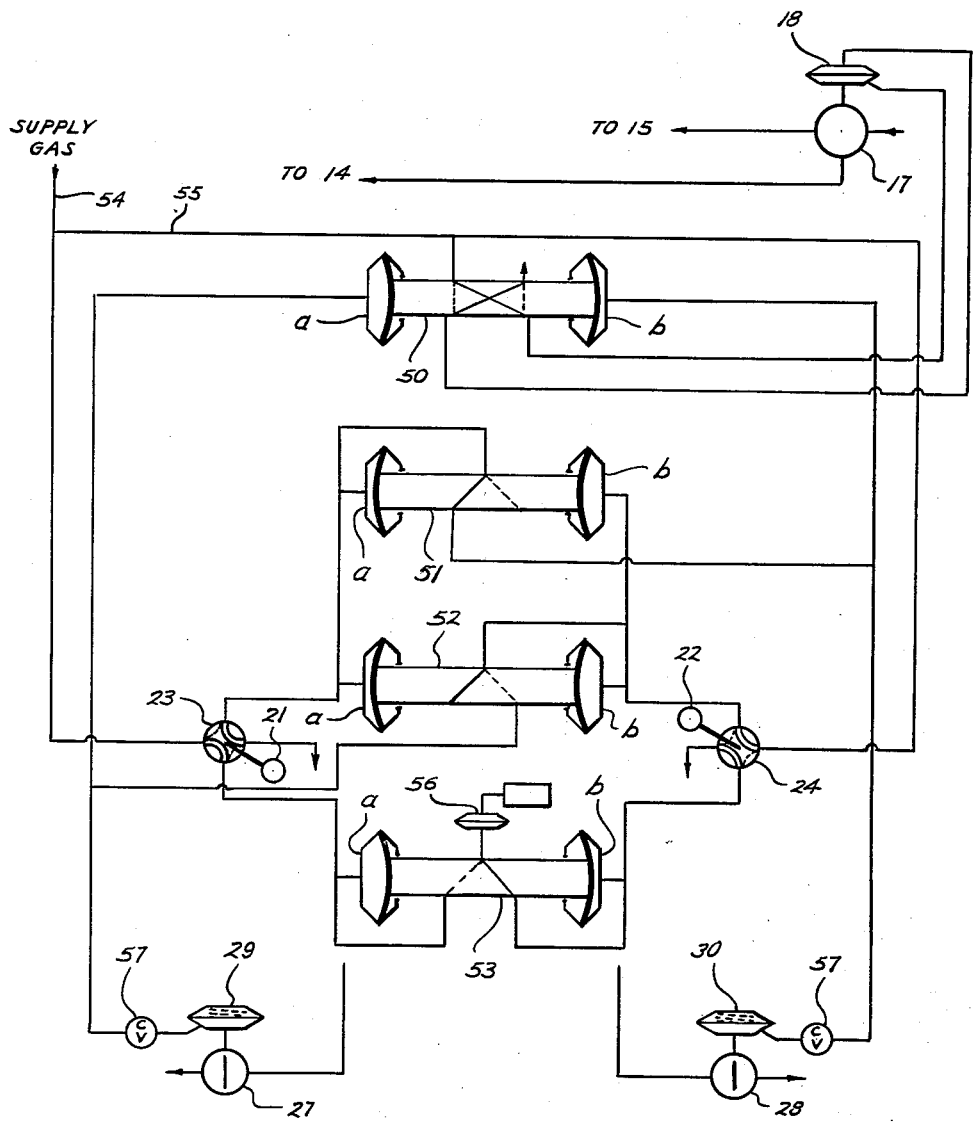

Nov. 12, 1963     R. K. FRANKLIN ETAL     3,110,171
HIGH CAPACITY LIQUID METER

Filed April 2, 1959     4 Sheets-Sheet 3

Robert K. Franklin
William M. Boren
Robert G. Oliphant
INVENTORS

BY Bertram H. Mann

ATTORNEY

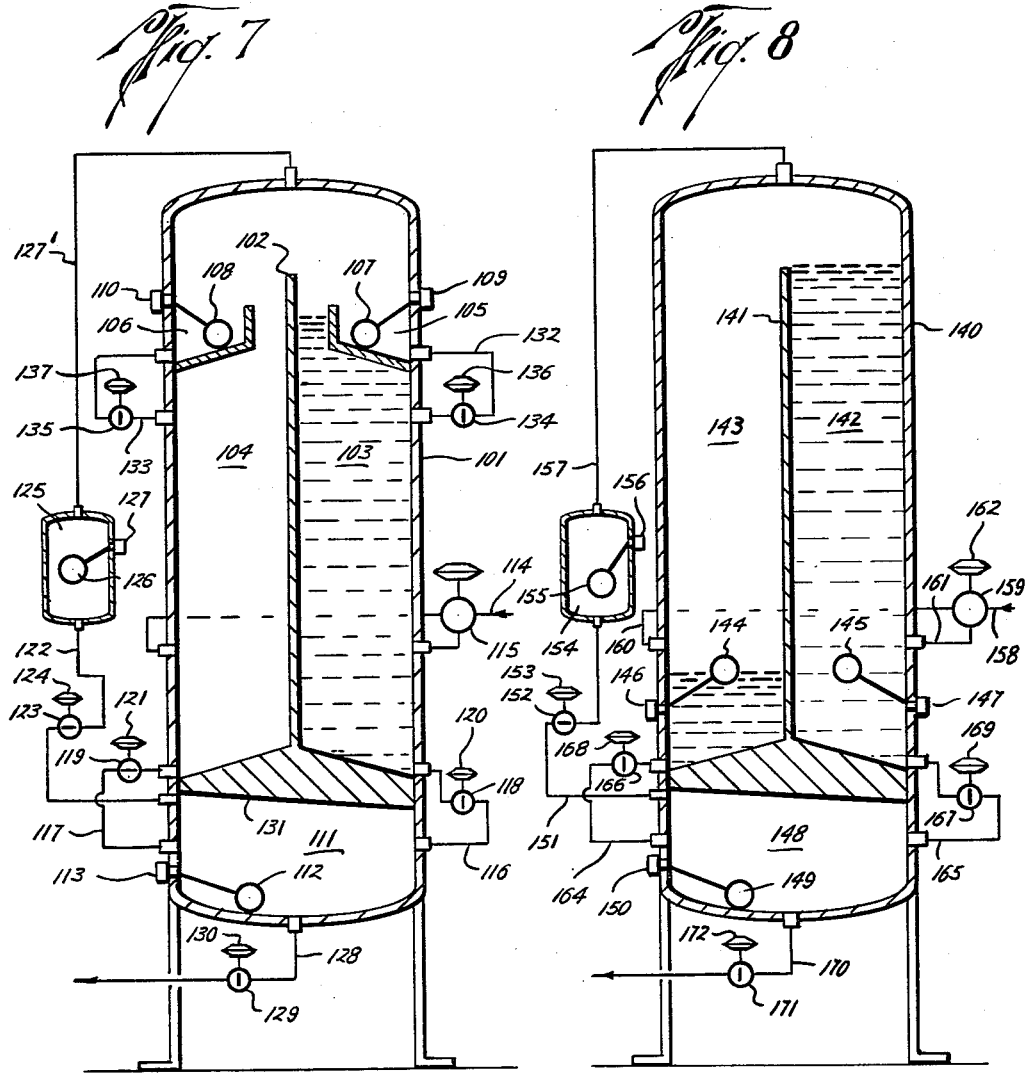

3,110,171
HIGH CAPACITY LIQUID METER
Robert K. Franklin, 1820 South Boulevard, William M. Boren, and Robert G. Oliphant, all of Houston, Tex.; said Boren and said Oliphant assignors to Rolo Manufacturing Company, Houston, Tex., a corporation of Texas
Filed Apr. 2, 1959, Ser. No. 803,736
3 Claims. (Cl. 73—221)

Our present invention relates to a high capacity liquid meter particularly adapted to determine the quantities of crude oil produced from an oil well, and includes various specific embodiments of its principles to resolve special oil field problems involving rapid and accurate metering and simultaneous metering and separating.

In the art of fluid measurement, it is acknowledged that the highest practical accuracy is obtained by volumetric meters, those in which a chamber of known volume is alternately filled and dumped. As a result of extensive research and development, we have invented certain meters and metering separators which provide accuracy of a high order in automatic fluid handling units. These inventions are disclosed and claimed in copending United States Applications Serial No. 645,163, filed March 11, 1957, now Patent No. 3,027,763, and Serial No. 703,782, filed December 19, 1957, now Patent No. 3,023,618. Certain features of those applications are incorporated in the devices of the present application, together with means to increase the capacity or rate of fluid measurement of a volumetric meter.

In the United States, the production from oil wells is regulated by law in most areas, and wells are seldom allowed to produce to their full capacity. As the output of each well must be determined separately for compliance with an established allowable production figure, there has been little demand for a meter capable of handling quantities in excess of 20,000 barrels per day. However, in certain foreign fields where legal allowables are unknown, extremely high rates of production from a single well are not uncommon, and it is also feasible to combine the output of several wells in a common separating and metering system. Thus prior volumetric meters with their relatively low capacities have proved unsuitable.

One of the chief capacity limitations of volumetric meters is the lack of continuity of flow. It is necessary to arrest the incoming fluid at regular intervals in order to dump the calibrated metering chamber. The dump time varies with the installation and depends on the design of the meter with regard to pipe and valve sizes, the means available to accelerate the discharge, and the viscosity of the fluid. However, it is apparent that even under optimum conditions, there is an inherent delay in a unit which cannot handle a continuous flow therethrough.

The dump time can be reduced by accelerating the discharge by any of several means. For example, a pump may be employed to more rapidly evacuate the metering chamber, or gas pressure may be applied to the metering chamber to accomplish the same end. It is, of course, necessary to separate the liquid constituents of the raw well fluid from the gas entrained therein insofar as possible prior to metering. This operation which is usually accomplished by a separate unit in the processing system makes its own demands on the available differential head and gas pressure, and thus, the often limited flow acceleration means must be carefully allocated to the point of maximum utility.

An additional limitation on speed of handling results from the high viscosity of certain well liquids. Extremely viscous crude oils will exhibit an obvious reluctance to flow rapidly through restricted areas such as pipes and valves. The importance of rapid closing valves to accurate volumetric metering is obvious from inspection of the aforementioned patent applications, and the fact that instantaneous operation becomes increasingly difficult and expensive to achieve as the viscosity of the liquid as well as the valve size increase makes it apparent that the sizes of the conduit between a separately housed meter and separator and the discharge conduit are limited. These limitations result in slow meter filling and discharge and present other problems to be overcome.

The entrained gas in high viscosity crude oils is more likely to resist separation than that in thinner liquids. Thus it quite often occurs that the gas and oil are only partially separated at the time of metering, and the additional treatment necessary to correct this situation is seldom economically justifiable. Rather, it is the practice to measure the fluid in its partially separated state and allow additional separation to occur after the fluid is stored.

These hitherto unresolved problems coupled with the always present problems of high accuracy and automatic operation have led to our present invention, the objectives of which may be briefly stated as follows:

It is an object of our invention to provide an automatic liquid meter which is capable of continuous, accurate measurement of large volumes of fluid.

It is also an object of our invention to provide a high capacity, volumetric meter which allows continuous and uninterrupted flow of incoming fluid.

It is a further object of our invention to provide a commonly housed separator and high capacity meter which is capable of continuously metering and separating a large volume of raw well fluid.

It is also an object of our invention to provide a well fluid metering separator which is capable of rapid handling of highly viscous fluid.

More specifically, it is an object of our invention to provide a meter and a separator in combination in which the passage of fluid from the separator to the meter is relatively unobstructed, and a maximum rate of discharge is obtained.

Still another object is to provide a high capacity, accurate volumetric liquid metering device, including a liquid seal preventing the loss into the discharge line of pressured gas provided for expelling the measured liquid from the meter and for maintaining priming of a pump used for expediting delivery from the meter.

It is also an object of our invention to provide a high capacity automatic liquid meter which will yield the external accuracies required for custody transfer, the operation in which volumes of crude oil are transferred from the custody of one party to another and payment is based on the number of units so transferred.

Briefly, the above objectives are accomplished by providing a tandem or parallel arrangement in which two similar metering chambers are situated in a side-by-side relationship and the fluid inlet is adapted for alternate discharge thereinto. By appropriate controls, the flow is so directed that one chamber is filling while the other is dumping, and by design, less time is required to dump than to fill. Therefore, flow into the meter is continuous, and the chamber into which it is directed alternates depending on the portion of the cycle at which the unit finds itself at a given moment. This novel construction provides a meter, with or without a separator, in which the above outlined advantages obtain, and continuous flow suitable to the needs of large volume producing fields may be handled.

Referring now to the drawings:

FIG. 1 is a vertical transverse section, shown partly schematic, of a high capacity meter constructed according to our invention;

FIGS. 2 and 3 are similar views of modified forms of high capacity separating meters;

FIG. 4 illustrates diagrammatically a control system for the devices of FIGS. 1–3;

FIG. 7 and 8 are sectional and schematic views of further modifications of the invention especially adapted as high capacity automatic custody transfer meters.

Figure 5:
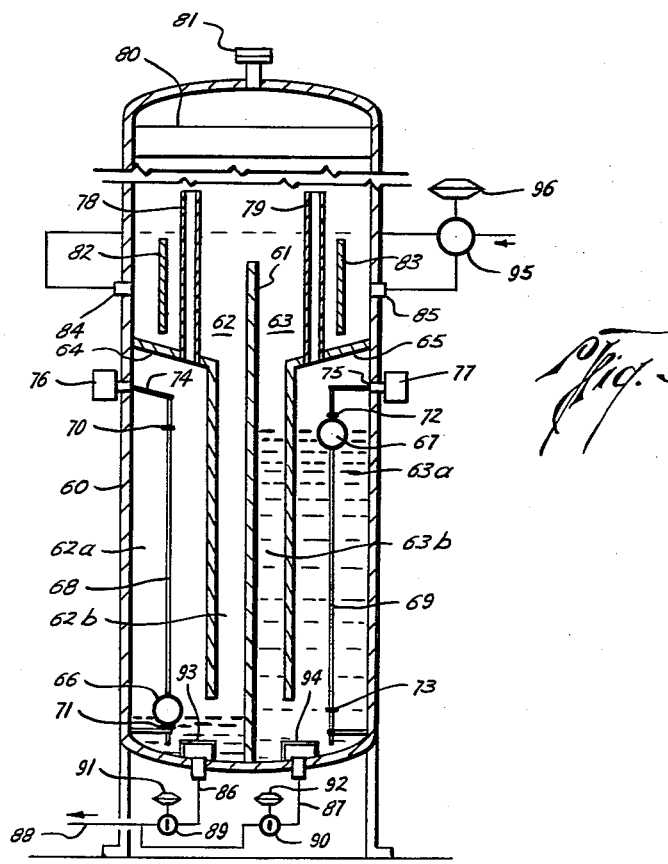
FIG. 5 is a view similar to FIGS. 1–3 showing another embodiment of the principles of our invention in a high capacity separating meter.

The form of the invention shown in FIG. 1 includes a casing 12 having a central partition 13 dividing the casing into separate parallel or tandem measuring reservoirs or chambers 14 and 15. Liquid is supplied to the top of the casing from an inlet line 16 through a three-way valve, generally indicated as 17, which is controlled by a pneumatic motor device 18 to alternately supply liquid to the reservoirs 14 and 15. At the bottom of the reservoirs are sumps 19 and 20 within which are floats 21 and 22, respectively, controlling pilot valves 23 and 24 of the control system. Liquid is discharged from the sumps through discharge lines 25 and 26, controlled, respectively, by valves 27 and 28, in turn, operated by pneumatic motor devices 29 and 30. Discharge lines 25 and 26, ultimately, merge in a single discharge pipe 31. Mounted intermediately of reservoirs 14 and 15 and terminating short of the bottom thereof are quieting panels 32 and 33.

This form operates as follows: Assume liquid is being supplied past three-way valve 17 into reservoir 15. When this liquid overflows partition 13 into sump 19, float 21 is lifted so as to reverse pilot valve 23 which, through pneumatic connection as shown in FIG. 4, reverses three-way valve 17 so as to cut off the supply to reservoir 15 and direct the inlet liquid into reservoir 14. After a brief delay to permit stabilizing of the liquid level in reservoir 15, discharge valve 28 is opened permitting the dumping of the accurately measured quantity of liquid in this reservoir to the discharge pipe 31. When reservoir 15 is emptied, float 22 drops and discharge valve 28 is closed. The capacity of discharge line 26 and valve 28, preferably, is greater than that of inlet valve 17 and the inlet connections to the parallel reservoirs so that reservoir 15 will be fully discharged before reservoir 14 is filled. Accordingly, when liquid in reservoir 14 overflows partition 13, float 22 will be lifted to again reverse the inlet valve and, after a brief delay, open discharge valve 27 to dump the measured quantity of liquid from reservoir 14 into discharge pipe 31. These alternating cycles will be repeated as long as liquid is supplied through inlet line 16 and without interrupting this inlet supply.

The form in FIG. 2 is quite similar to that in FIG. 1 except for the addition of a mist separator 35 at the top of casing 36. Baffles 32' and 33' are, respectively, located substantially in the lines of discharge from the liquid inlets so as to facilitate separation of gases from the liquid. Otherwise, the structure and operation of this form is the same as in the first form and various parts are given the same reference numerals each with a prime added.

FIG. 3 shows a somewhat differently-shaped casing 40 having a central partition 13″ and centrally-pivoted floats 22″ and 21″. Pneumatic lines to pilot valves 23″ and 24″ are led through hollow standards 41 and 42 which pivotally mount the floats. Apertured partitions 43 and 44 assist in the separation of gases from the liquid supplied through the inlets, these gases being directed into a mist separator 45. Other parts are designated by the same reference numerals as in FIG. 1, but each with a double prime.

FIG. 4 shows, diagrammatically, the pneumatic control system for the forms in FIGS. 1, 2 and 3. In FIG. 4, the alternate flow lines through the various valves are shown, respectively, in solid and dotted lines, as will be explained. The essential elements of this control are four master valves 50, 51, 52 and 53, each pneumatically operated in opposite directions by pressure chambers, designated $a$ and $b$, respectively, on opposite ends of the valves. Valve 50 is a four-way valve and valves 51, 52 and 53 are three-way valves, the alternate paths of fluid through the valves being indicated by solid and dotted lines. An understanding of the control may be derived from a consideration of its functioning as follows: With both floats 21 and 22 down, assume master control valve 50 for inlet switching valve 17 is in its solid flow line position to direct pressure from line 55 into the bottom of motor 18 and adjust valve 17 to direct oil into measuring reservoir 15 at the right side of partition 13. As float 22 lifts and pilot 24 moves to the solid flow line position, gaseous pressure from supply line 54, 55 is admitted to chambers $b$ of master valves 51 and 52 so as to shift these valves leftwardly. Chambers $a$ of the valves are exhausted through the solid flow lines of pilot valve 23, float 21 being down. In the leftward, solid flow line position of master valve 51 with float 21 down and pilot valve 23 in its solid flow line position, pressure from line 54 is cut off from control motor 30 of discharge valve 28 and this valve is closed by its spring. In the leftward position of master valve 52 (solid flow line position) with float 22 up, pressure from line 55 and pilot valve 24 is cut off from control motor 29 of discharge valve 27, and this valve remains closed.

As measuring reservoir 15, fills and overflows into reservoir 14, float 21 in the latter is lifted to shift pilot 23 to the dotted flow line position so as to direct pneumatic pressure from line 54 to chambers $a$ of master valves 51 and 52, but these master valves are not shifted since opposite pressure chambers $b$ thereof remain pressured. Control chamber $a$ of master valve 53 and the counter are exhausted. Pressure from line 54 is also directed through master valve 51 (still in its solid flow line position) to motor 30, so as to open discharge valve 28 after a brief interval, as determined by the seating of a one-way check valve restriction 57, and to pressure chamber $b$ of master valve 50, shifting valve 50 to the dotted flow line position and, thereby, reversing feed valve 17 to cut off the supply of liquid to reservoir 15 and, at the same time, direct the incoming liquid into reservoir 14.

Reservoir 14 now starts to fill while reservoir 15 drains its measured quantity of liquid. When float 22 in the latter reservoir drops, its controlled pilot valve 24 rotates to the dotted flow line position so as to exhaust chambers $b$ of master valves 51 and 52 which permits both of these master valves to shift rightwardly to their dotted flow line positions. At the same time, control chamber $b$ of master valve 53 is pressured, shifting this valve leftwardly to its dotted flow line position to apply a counting impulse to counter 56 and the cycle now completed is repeated.

In the form in FIG. 5, casing 60 is provided with a central partition 61 dividing the casing into separate reservoirs 62 and 63. Within the reservoirs, there are provided generally L-shaped separating baffles 64, 65 which depend nearly to the bottom of the casing and form quiet chambers therebeneath. In each quiet chamber 62a, 63a, there is received a float 66, 67 which is slidable on a vertical rod 68, 69. These rods have stops 70, 71 and 72, 73 and, at their upper extremities, are connected to levers 74, 75 which operate pilot valves 76 and 77.

Tubes 78 and 79 direct gases trapped beneath separating partitions 64 and 65 into the upper part of the main casing where, together with other gases separated from the incoming liquid, they are passed through mist separator device 80 and gas outlet 81. Partitions 82 and 83 abreast inlet ports 84, 85 facilitate separation of gases from the liquids emerging from the inlets. At the bottom of the casing, discharge lines 86 and 87 merge in a common discharge pipe 88. These discharge lines are controlled, respectively, by valves 89 and 90 actuated by pneumatic motor devices 91 and 92. The discharge ports are provided with protecting screens or baffles 93 and 94. Liquid is admitted to the casing through a three-way valve 95 actuated by a pneumatic motor 96.

In operation of the form in FIG. 5, three-way valve 95 alternately directs inlet liquid into one or the other of chambers 62 and 63. This liquid drops down through one of the ample passages 62b, 63b and thence passes upwardly into corresponding quiet chamber 62a or 63a. When the float is lifted sufficiently, it engages upper stop 70 or 72 to actuate pilot valve 76 or 77. This causes opening of a discharge valve 89 or 90 and shifting of inlet valve 95 to direct the inlet fluid into the opposite reservoir. When the measured volume of liquid in the reservoir is discharged and the float drops, engaging one of the lower stops 71 or 73, the open discharge valve is closed preparatory to another switching of three-way inlet valve 95 to again direct inlet fluid into the first reservoir to repeat the cycle.

Figure 6:
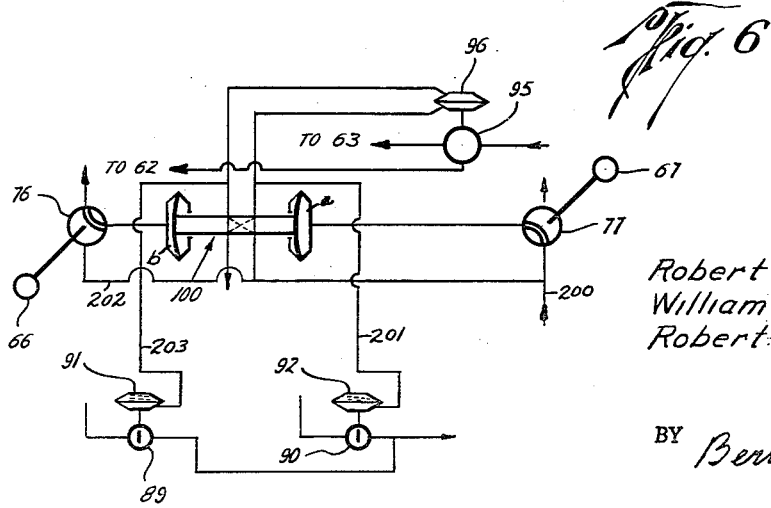
FIG. 6 is a diagram of a suitable control system for the unit illustrated in FIG. 5.

FIG. 6 shows a pneumatic control system for the form of meter in FIG. 5. The control includes a single master or slave valve 100 having opposite pneumatic control chambers $a$ and $b$ and in which the alternate flow paths are indicated, respectively, by solid and dotted lines, as will be explained. The parts are shown just subsequent to shifting, with actuating diaphragm motors $a$ and $b$ in their leftward positions to open the solid flow lines and direct pneumatic pressure from the supply lines 200 to the bottom of motor 96. This places three-way valve 95 in a condition to cause inlet oil to be cut off from reservoir 63 and directed into reservoir 62 at the left side of partition 61. This shifting of valve 95 is effected as lever 75 is lifted by float 67. At the same time, pressure is supplied from source 200 and line 201 to pneumatic motor 92 for opening discharge valve 90 so as to direct the measured quantity of liquid in reservoir 63 into the discharge line. FIG. 6 shows opposite float 66 dropped and its pilot valve 76 in a position to exhaust lefthand pneumatic chamber $b$ of master valve 100 to permit the just-mentioned leftward movement of the master valve.

When float 67 drops, indicating emptying of metering chamber 63, pilot 77 will move to cut off pressure from slave valve motor $a$, and this valve will remain in its leftward position. However discharge valve motor 92 is exhausted through line 201 and valve 77, closing valve 90. As soon as opposite float 66 is fully lifted and its pilot valve 76 thereby reversed, the consequent supply of control pressure through line 202 to chamber $b$ of the master valve will shift the latter rightwardly to its dotted flow line position. This will direct pneumatic pressure from line 200 to the top of motor 96 to shift inlet control valve 95, returning the inlet delivery to reservoir 63. This motion of the master valve also will apply pneumatic pressure to motor 91 to open discharge valve 89. The discharge lines are of at least as great capacity as or greater capacity than the inlet connections to insure complete discharge of each metering chamber before the opposite metering chamber is filled. This insures continuous supply through the inlet and, accordingly, maximum capacity of the meter.

FIG. 7 shows a tandem meter with liquid seal which is well adapted to serve as a high accuracy, high capacity custody transfer meter. This meter consists of a main casing 101 having a central partition 102 dividing the casing into metering reservoirs or chambers 103 and 104. In the tops of these metering chambers are overflow chambers 105 and 106 having therein, respectively, floats 107 and 108 actuating pilot valves 109 and 110. Below the outwardly inclined bottom walls of metering chambers 103 and 104, which facilitate complete draining thereof, is a liquid seal chamber 111 in which is received a float 112 actuating a pilot valve 113. Oil inlet line 114 is connected to a three-way valve 115 which, as indicated, selectively directs the inlet supply to one of metering reservoirs 103 or 104. Chambers 103 and 104, respectively, are connected to the seal chamber by drain passages 116 and 117 controlled by dump valves 118 and 119, provided with actuating pneumatic motors 120 and 121. The seal chamber is provided with a vent line 122 containing a valve 123 actuated by a pneumatic motor 124. The vent line terminates in a vent chamber 125 containing a float 126 which actuates a pilot valve 127, and a balancing connection 127' to the top of the main casing. Discharge line 128 at the bottom of the seal chamber is controlled by a discharge valve 129 actuated by a pneumatic motor 130. Inclined top wall 131 of the seal chamber facilitates venting of all gases from this chamber. Transfer passages 132 and 133 connect the overflow chambers to the metering reservoir. These passages are controlled by valves 134 and 135 actuated by pneumatic motors 136 and 137.

The operating cycle of this meter is as follows: Initially, all four floats 107, 108, 112 and 126 are down. Assume that inlet valve 115 is in position to direct liquid into measuring reservoir 103. The dumping line 117 between opposite reservoir 104 and seal chamber 111 is closed, as will be the dumping connection 116 and discharge valve 129. Ultimately, the liquid in chamber 103 will overflow into chamber 105 and lift float 107. This float action, through its pilot valve and operative connections will cause shifting of inlet valve 115 to cut off the supply of oil to reservoir 103 and direct the supply to reservoir 104. The same action of float 107 will open dump valve 118, so that the measured quantity of liquid in reservoir 103 will be discharged into liquid seal chamber 111 through passage 116. This discharged liquid will fill seal chamber 111, lifting float 112, and also will enter vent 122, through open vent valve 123, and vent chamber 125. When vent chamber float 126 is lifted, indicating exclusion of all gas from chamber 111, its pilot valve 127 will be actuated so as to cause, through suitable operative connections, opening of discharge valve 129. This continues the discharge part of the cycle started upon reversal of valve 118. Coincident with opening of the discharge valve, vent valve 123, optionally, may be closed to exclude casing gas from the seal chamber. If desired, this delivery of liquid to the discharge line may be expedited by gas pressure in the top of casing 103, or by a pump in the discharge line. In the former case, vent line 127' insures balancing of pressures in casing 103 and chamber 125 during initial dumping from the measuring chamber. In either case, however, float 112 will drop before the seal chamber is completely empty, closing discharge valve 129. This will prevent the discharge of gas from the meter into the discharge line while maintaining a prime in the discharge pump, where provided.

When discharge valve 129 is closed, dump valve 118 will close, vent valve 123 will be re-opened so as to drop the oil remaining in the vent line and chamber 125 into seal chamber 111, and transfer valve 134 will be actuated for a short period, by its motor 136 and operative connections to seal chamber float valve 113 to drain liquid from overflow chamber 105 into metering reservoir 103 where it joins the inlet supply being measured. During the discharge operations, filling of opposite meter reservoir 104 will continue until overflow into chamber 106 actuates float 108 to repeat the overflow and discharge cycle. As in the previous forms, the dumping and discharge lines and valves are of greater capacity than the inlet lines to insure emptying of the measuring and seal chambers before actuation of the overflow float in the particular metering reservoir being filled reverses the inlet supply and initiates the dumping of the measured quantity of liquid. Upon draining of reservoir 104 and immediately subsequent dropping of seal float 112, dump valve 119 is closed, vent valve 123 is opened, and drain valve 135 is momentarily opened to prepare reservoir 104 for the next metering cycle initiated by lifting of opposite overflow float 107.

FIG. 8 shows a tandem meter incorporating, in general the principles of FIGS. 1–3, and also including a liquid seal chamber. As before, the main casing 140 is divided by a partition 141 into metering reservoirs 142 and 143 containing floats 144 and 145 in their lower portions. The floats, respectively, control pilot valves 146 and 147. Below the inclined bottom walls of reservoirs 142 and 143, is a liquid seal chamber 148 containing a float 149 which actuates a pilot valve 150. A vent line 151 leads from the seal chamber through a normally-open vent valve 152, with an actuating pneumatic motor 153, to a vent chamber 154 containing a float 155 which actuates a pilot valve 156. A vent line continuation 157 connects the top of the vent chamber to the top of the main casing for equalizing the gas pressures therein. Oil inlet line 158 connects through three-way inlet valve 159 with either of the lines 161 or 160 leading to the respective metering reservoirs 142 and 143, in accordance with the position of valve 159. Valve 159 has an actuating pneumatic motor 162. Chambers 143 and 142 may be dumped through fluid connections 164 and 165 with the seal chamber, having control valves 166 and 167 with actuating motors 168 and 169. Discharge from the seal chamber is through line 170 and normally closed discharge valve 171 having actuating motor 172.

The operating cycle of this form is as follows: Assume inlet valve 159 is in position to direct inlet oil into reservoir 142 which has overflowed into reservoir 143 so as to lift float 144. This causes, through suitable operating connections, shifting of inlet valve 159 to cut off the inlet supply to reservoir 142 through line 161 and direct this supply into reservoir 143 through line 160. At the same time, dump valve 167 will be opened and the measured quantity of liquid in reservoir 142 will be dumped through line 165 into liquid seal chamber 148. Ultimately, the seal chamber will be filled, lifting float 149, and liquid will pass through vent line 151 and open valve 152 into chamber 154 where float 155 will be lifted. This will act through pilot valve 156 to open discharge valve 171 and, optionally, close vent valve 152. When the liquid in seal chamber 148 and the remaining liquid in metering reservoir 142 are drained out and discharged, permitting seal chamber float 149 to drop, discharge valve 171 and dump valve 167 are closed and vent valve 152, optionally, re-opened to permit the liquid remaining in the vent chamber to drop into the seal chamber. Reservoir 142 will now be empty ready to receive the overflow from reservoir 143, as in the beginning of the cycle described.

The metering arrangement of FIGS. 7 and 8 as well as of FIGS. 1, 2, 3, and 5, may be provided with any suitable control connection between the various floats and valves, whether pneumatic, electrical, or hydraulic, for accomplishing the operating cycles, as described. Each of the forms of the meter incorporates the tandem principle for insuring continuous flow through the inlet line while the measuring reservoirs alternately fill and empty. Since, by design, the discharging valves and passages are of at least as great capacity as or greater capacity than the inlet, there will be no interruption of the inlet flow and metering action. It would, of course, be possible to provide three or more metering reservoirs in tandem if the inlet rate were sufficiently large to justify this in view of the necessary limitations of valve sizes to insure rapid action of the valves. The forms in FIGS. 1–3 and 7 and 8, utilizing the overflow principle for obtaining an accurately measured volume of liquid, will be somewhat more accurate than the form in FIG. 5 which is subject to inaccuracies of float action. Each of the meters, however, is well adapted for measuring high capacity flows and, due to the relatively large inlet ducts within the meter itself, to handle viscous oils. The addition of a mist separator, as in FIGS. 2, 3 and 5, which feature could be added to any of the forms, equips the meter for handling oils with substantial gas content. The liquid seal feature permits the use of gaseous pressure within the meter for expediting discharge therefrom, without the danger of the pressured gas escaping into the discharge line, and also insure the exclusion from the discharge of volatile constituents carried from the metering chambers. The seal also facilitates the use of a discharge pump by avoiding the danger of gas being drawn into the pump and discharge line. The structures shown may be modified in various respects as will occur to those skilled in the art and the exclusive use of all modifications as come within the scope of the appended claims is contemplated.

We claim:
1. A liquid meter comprising
   a closed casing
   with partitioning means defining first and second liquid measuring reservoirs therein,
   a liquid seal chamber directly below said reservoirs in the lower part of said casing,
   devices associated with said reservoirs for registering the volume of liquid therein,
   inlet ducting connected to said reservoirs,
   outlet ducting connected to said seal chamber,
   means for maintaining in said seal chamber sufficient liquid to seal said outlet ducting and said seal chamber at all times,
   transfer passages, respectively, between said reservoirs and said seal chamber,
   valves controlling said transfer passages and said inlet and outlet ducting, and
   operative connections between said volume registering devices and said valves for initially opening said inlet ducting into said first reservoir while opening the transfer passage between said second reservoir and said seal chamber,
   then opening said outlet ducting,
   then, when said second reservoir is drained and said first reservoir is filled, cutting off said outlet ducting and said inlet ducting leading to said first reservoir and said transfer passage between said second reservoir and said seal chamber,
   then opening said inlet ducting leading to said second reservoir,
   then opening the transfer passage between said first reservoir and said seal chamber,
   and finally re-opening said outlet ducting
   whereby measured quantities of liquid are alternately discharged from said reservoirs and said casing while liquid is continuously supplied to said casing through said inlet ducting.
2. A liquid meter comprising
   a closed casing with
   partitioning means defining a plurality of side-by-side chambers therein,
   inlet and outlet ducting connected to certain of said chambers,
   floats in certain of said chambers each for reacting to overflow from another chamber to signal filling of said other chamber,
   a liquid seal chamber in the lower part of said casing and directly beneath said last-mentioned chambers,
   transfer ducts, respectively, between said last-mentioned chambers and said seal chamber,
   each of said transfer ducts having valves,
   a discharge duct with a valve leading from said seal chamber,
   means in said seal chamber for maintaining sufficient liquid therein to seal said discharge duct from casing gases at all times,
   and operative connections between said floats and said inlet, transfer, and discharge valves for first opening said inlet ducting to a first of said first mentioned chambers and substantially concurrently closing the transfer duct valve from said first chamber while cutting off said inlet ducting to a second of said first mentioned chambers, then opening said discharge valve to drain the measured quantity of liquid from said seal chamber, then closing said discharge valve, then reversing said inlet and transfer duct valves, and, finally, again opening said discharge valve long enough to drain a second measured quantity of liquid from the casing to complete the cycle during continuous flow through said inlet duct into said casing.

3. A liquid meter as described in claim 2, wherein, said side-by-side chambers define first and second reservoirs separated by a weir and said floats are each located near the lower portion of the respective chamber for signalling filling of the other chamber to enable each chamber to function as measuring means during part of the cycle and as an overflow chamber during another part of the cycle, said float and said operative connections between the floats and the valves being effective to control lower levels of liquid in said chambers.

References Cited in the file of this patent

UNITED STATES PATENTS

| | | |
|---|---|---|
| 1,521,391 | Roach et al. | Dec. 30, 1924 |
| 2,831,350 | Banks et al. | Apr. 22, 1958 |
| 2,876,641 | Brown | Mar. 10, 1959 |
| 2,954,693 | Nelson | Oct. 4, 1960 |

OTHER REFERENCES

Shell's Proposal in an article entitled "Automatic Custody Transfer in Texas" in the Oil and Gas Journal, July 30, 1956, vol. 54, No. 48, pp. 122, 123.